G. R. STEIN.
VEHICLE CAMPING ATTACHMENT.
APPLICATION FILED SEPT. 15, 1915.

1,196,309.

Patented Aug. 29, 1916.
2 SHEETS—SHEET 1.

WITNESSES:
L. J. Forde
Nita E. Penfield

INVENTOR
George. R. Stein.
BY Strong and Townsend
ATTORNEYS.

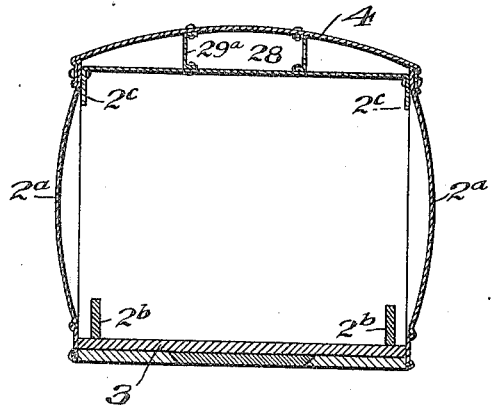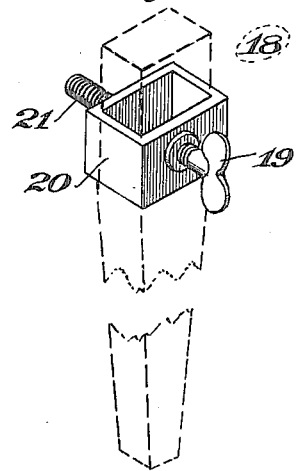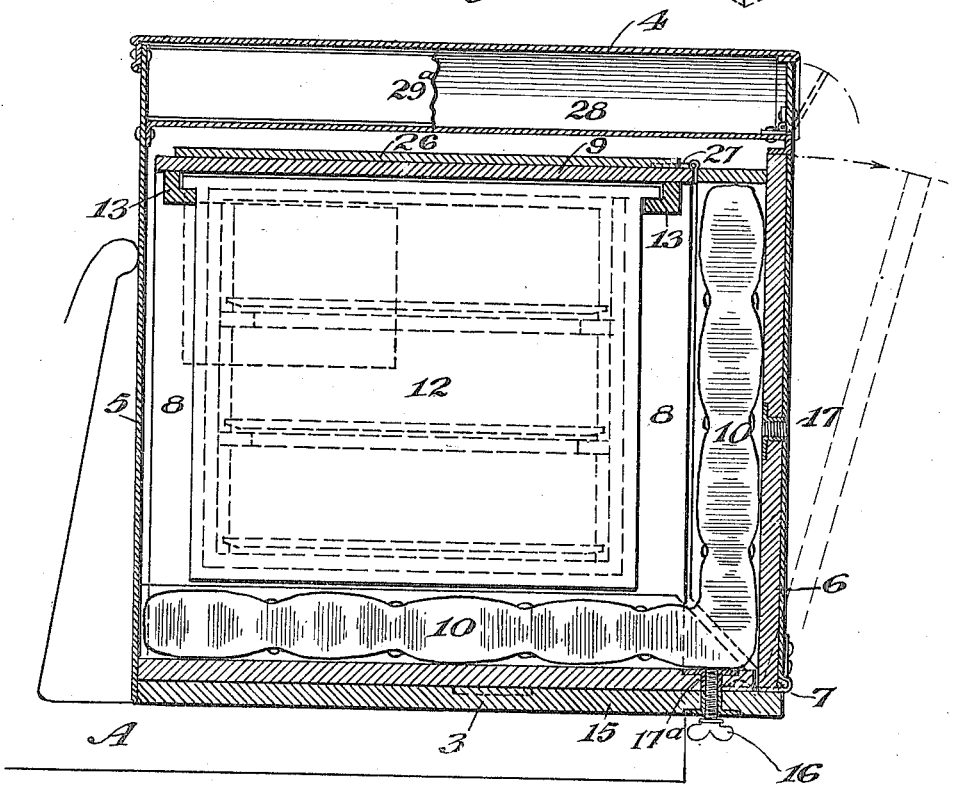

UNITED STATES PATENT OFFICE.

GEORGE R. STEIN, OF SAN FRANCISCO, CALIFORNIA, ASSIGNOR TO GUSTAV DE BRETTEVILLE, OF SAN FRANCISCO, CALIFORNIA.

VEHICLE CAMPING ATTACHMENT.

1,196,309. Specification of Letters Patent. Patented Aug. 29, 1916.

Application filed September 15, 1915. Serial No. 50,777.

*To all whom it may concern:*

Be it known that I, GEORGE R. STEIN, a citizen of the United States, residing at the city and county of San Francisco and State of California, have invented new and useful Improvements in Vehicle Camping Attachments, of which the following is a specification.

This invention relates to a vehicle camping attachment.

One of the objects of the present invention is to provide a simple, substantial cheaply manufactured camping attachment, particularly designed for attachment to automobiles or like vehicles. The attachment consists of a box-like structure interiorly of which is mounted a plurality of hinged and extensible sections containing compartments for the reception of various articles, such as a stove, cooking utensils, groceries, guns, fishing tackle, etc., and which also contains a bed which is adapted to be extended and inclosed when in use.

Further objects will hereinafter appear.

The invention consists of the parts and the construction and combination of parts, as hereinafter more fully described and claimed, having reference to the accompanying drawings, in which—

Figure 1:
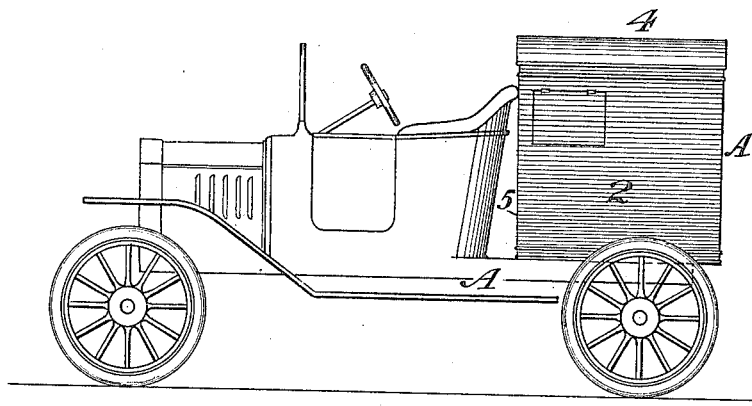
Figure 2:
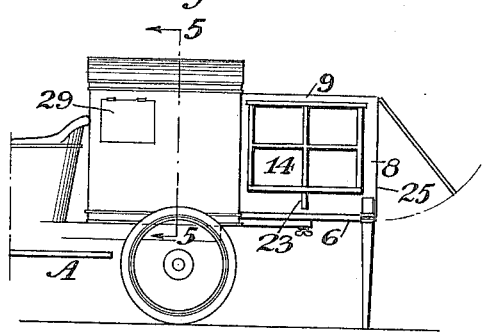
Figure 3:
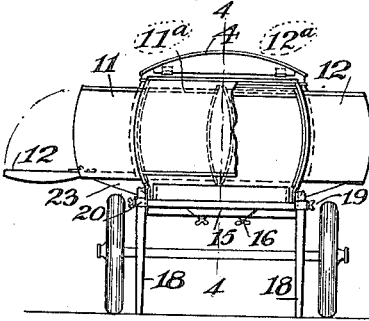
Figure 4:
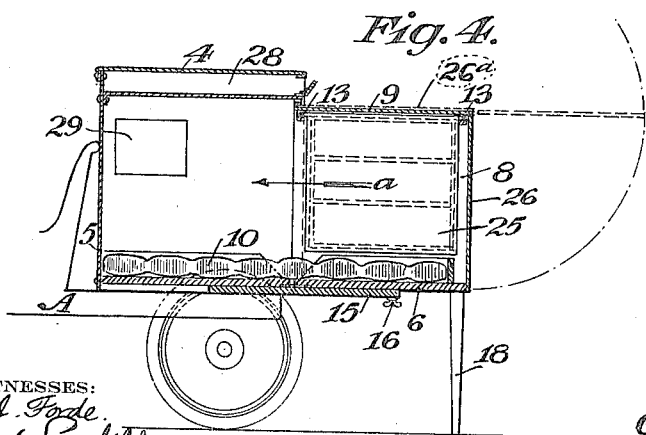

Figure 1 is a side elevation of an automobile showing the application of the invention. Fig. 2 is a side elevation of the attachment, showing the parts in extended position. Fig. 3 is an end view of Fig. 2. Fig. 4 is a longitudinal section on line 4—4, Fig. 3. Fig. 5 is a cross section on line 5—5, Fig. 2. Fig. 6 is a perspective view of one of the detachable supporting links. Fig. 7 is a longitudinal section through the main casing, showing the closed position.

Referring to the drawings in detail, A indicates the main frame of an automobile, on the rear end of which is suitably secured the camping attachment, generally indicated at A. The attachment consists of a box-like structure, consisting of side panels 2; a bottom 3; a roof 4 and a front end section 5. The rear end of the structure or casing A is provided with a door 6, which is secured thereto by means of hinges 7. Suitably mounted interior of the main casing is a frame which consists of the side sections 8 and a top section 9, which ties the two side members 8 together. This frame is slidably mounted and adapted to be moved into the main casing telescope-wise or extended into the position, indicated in Fig. 4. The frame is provided for two purposes: 1st. To form a cover for a bed 10; 2nd. To form a support for a pair of extensible containers 11 and 12; one on each side of the frame. These containers are slidably mounted in the frame and are carried by track sections 13, which are secured to the cover section 9 on the lower side and positioned cross-wise of same. The containers 11 and 12 may be divided into several compartments, as shown and these compartments form receptacles such as indicated at 14 for various articles, such as a camping stove, cooking utensils, groceries, wearing apparel, etc.

The compartments 11 and 12 when moved into the sliding frame assume the dotted line positions, indicated at $11^a$ and $12^a$, see Fig. 3, and when moved back into the frame on the track sections 13; it is possible to move the frame telescope-wise back into the main casing A in the direction of arrow $a$, with the parts in collapsed or folded position, and when it is desired to move same into extended position, it is only necessary to release the door 6 and drop it into the position, indicated in Fig. 4. It is here first supported by means of a sliding leaf 15, slidably mounted in the base section 3, on the main casing A. This leaf is provided with a pair of thumb screws 16, near the outer end, which when the leaf is moved out to support the door 6, come into register with a pair of threaded sockets 17 secured in the door. The thumb screws are then screwed into the threaded sockets, in this manner securing the leaf in position, and at the same time partly supporting the door 6. A pair of detachable and extensible supporting legs 18 are then applied to further support the door. These extensible legs are secured clamp-wise by means of the thumb screws 19, in rectangular-shaped socket members 20, which are secured to the sides and outer ends of the door 6, by threaded studs 21, which are adapted to be screwed into the side of the door.

With the socket members 20 secured in position, it is possible to raise and lower the legs 18, by slackening up on the thumb screws 19 and adjust same to suit any rises or depressions in the ground. With legs 18 adjusted and secured in position, it will be seen that a rigid, substantial support has been provided for the door 6, which will now form a support for the sliding frame. This is next pulled out on the door into the position, indicated in Fig. 4, and will in this position form a cover for the bed, indicated at 10; the remainder of the bed being positioned interior of the casing A is covered by same and is therefore, completely covered over its entire length. A pair of leaf supporting arms 23 pivotally mounted in the side frames 8, are then swung out into the position shown in Fig. 3, to form supports for the containers 11 and 12, which may now be extended and supported by same. With the containers moved into the extended position shown in Fig. 3, it will be seen that the entire interior of the sliding frame and the main casing is entirely open and free from obstructions and that access to the bed 10 is thus permitted, by entering through the rear open end 25 of the sliding frame, which may be closed if desired by a door 26, hinged as at 27 to the rear end of the cover 9. This door normally assumes the dotted line position indicated at 26ᵃ on top of the cover 9, when not in use, but may be swung about the hinge 27 to close the open end of the sliding frame, if desired.

With the parts extended as described, a complete and rigid support for the bed 10 and a complete covering for same has been provided; the extended position of the containers 11 and 12 permits ready access to the several compartments, permitting the device to be used as a kitchen; the container 11 being provided with a hinged side door 12, permits this to be folded down, as shown in Fig. 3, to serve as a table.

Extending cross-wise of the side panels 2 of the main casing, in a position just above the top 9 of the sliding frame is a partition or ceiling member, which permits the formation of a compartment 28, which may be divided by cross strips 29ᵃ into several compartments, which may be used for the purpose of storing away guns, fishing tackle, fishing rods, and the removable, extensible legs 18. The main casing may also be provided with hinged windows 29, which may be opened to secure light or ventilation, when desired.

The structure as a whole is refolded or closed in the following manner: The rear door 26 is first swung about its hinge 27 to assume the dotted line position 26ᵃ, on top of the cover section 9. The bed is then made up and the table 12 closed with relation to the container 11. Containers 11 and 12 are then moved into the sliding frame to assume the dotted line lositions 11ᵃ and 12ᵃ. The sliding frame is then moved telescope-wise into the main casing to assume the position, indicated in Fig. 7; this being permitted, as the bottom line of the containers 11 and 12 is sufficiently elevated to permit same to pass over the bed. The extensible legs are then removed together with the sockets 20 and placed in one of the compartments formed under the roof 4. The thumb screws 16 are then unscrewed with relation to the threaded socket 17, and the leaf moved back into the position, indicated in Fig. 7 where it is secured by again tightening up the thumb screws, which will now be in register with threaded sockets 17ᵃ. The rear door 6 containing the end of the bed which is suitably secured thereto by means, not here shown, is then raised about the hinge 7, until it assumes the closed position, shown in Fig. 7; being secured in this position by a latch, lock or any other suitable means. The camper is now ready to drive on, and everything contained is thoroughly covered and protected from rain and dust, while traveling and may be again extended or unfolded when camp is to be made.

The device as a whole, is simple and compact in construction, and the telescoping and folding of the several parts, permits the packing and storing of the bed and entire camping outfit, without wasting any space or necessitating an unwieldly pack, such as is usually the case.

As shown in Fig. 5 the side panels 2ᵃ are convex to increase the inclosed space. Vertical flanges interior to those sides form guides for the sliding frame.

The materials and finish of the several parts of the device may be such as the judgment and experience of the manufacturer may dictate.

I wish it understool that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A structure of the character described comprising a main casing, a frame adapted to be moved into and out of the casing, means for supporting the frame in its extended position, a pair of containers slidably mounted in the frame and adapted to be moved into or extended exterior of the frame, and means for supporting the containers in the extended position.

2. A structure of the character described comprising a main casing, a frame adapted to be moved into and out of the casing, means for supporting the frame in its extended position, a pair of containers slidably mounted in the frame and adapted to be moved into or extended exterior of the frame, and means carried by the frame for supporting the containers in the extended position.

3. A structure of the character described comprising a box-shaped casing open at one end, a door hinged at its lower end to form a closure for said open end, detachable and adjustable legs adapted to support the door in an open horizontal position, a frame adapted to be moved telescope-wise into or extended exterior of the casing and supported on the table, and a pair of containers carried by the frame, said containers being slidably mounted in the frame at right angles to the sliding movement of the frame.

4. A structure of the character described, comprising a box-shaped casing open at one end, a door hinged at its lower end to form a closure for said open end, detachable and adjustable legs adapted to support the door in an open horizontal position, a frame adapted to be moved telescope-wise into or extended exterior of the casing and supported on the opened door, a pair of track members secured to the top of the sliding frame and extending cross-wise of same, and a pair of containers slidably mounted on said track members.

5. A vehicle camping attachment, including a casing having an arched top and shallow, horizontal compartments beneath said top, a main compartment with hinged closable end door, forming a horizontal extension of the case when opened, a dovetailed section of the case bottom, slidable beneath and supporting said door, and a bed extending over the door and the case bottom, and foldable in line of the door hinges when closed.

6. A vehicle camping attachment, including an arched compartment case having a hinged rear door opening downward, and outward, and a dovetailed slidable section of the bottom adapted to support said door, transversely slidable compartments fitting the case, a bed attached to the bottom and to the rear door, foldable against the compartments when closed, and extensible with the opened door, and a supplemental door normally contained in the upper part of the case and adapted to open downward to close the rear of the bed space when extended.

In testimony whereof I have hereunto set my hand in the presence of two subscribing witnesses.

GEORGE R. STEIN.

Witnesses:
W. W. HEALEY,
M. E. EWING.

Copies of this patent may be obtained for five cents each, by addressing the "Commissioner of Patents, Washington, D. C."